June 5, 1923.
L. A. W. JOHNSON
1,457,630
HEADLIGHT
Filed Aug. 12, 1920
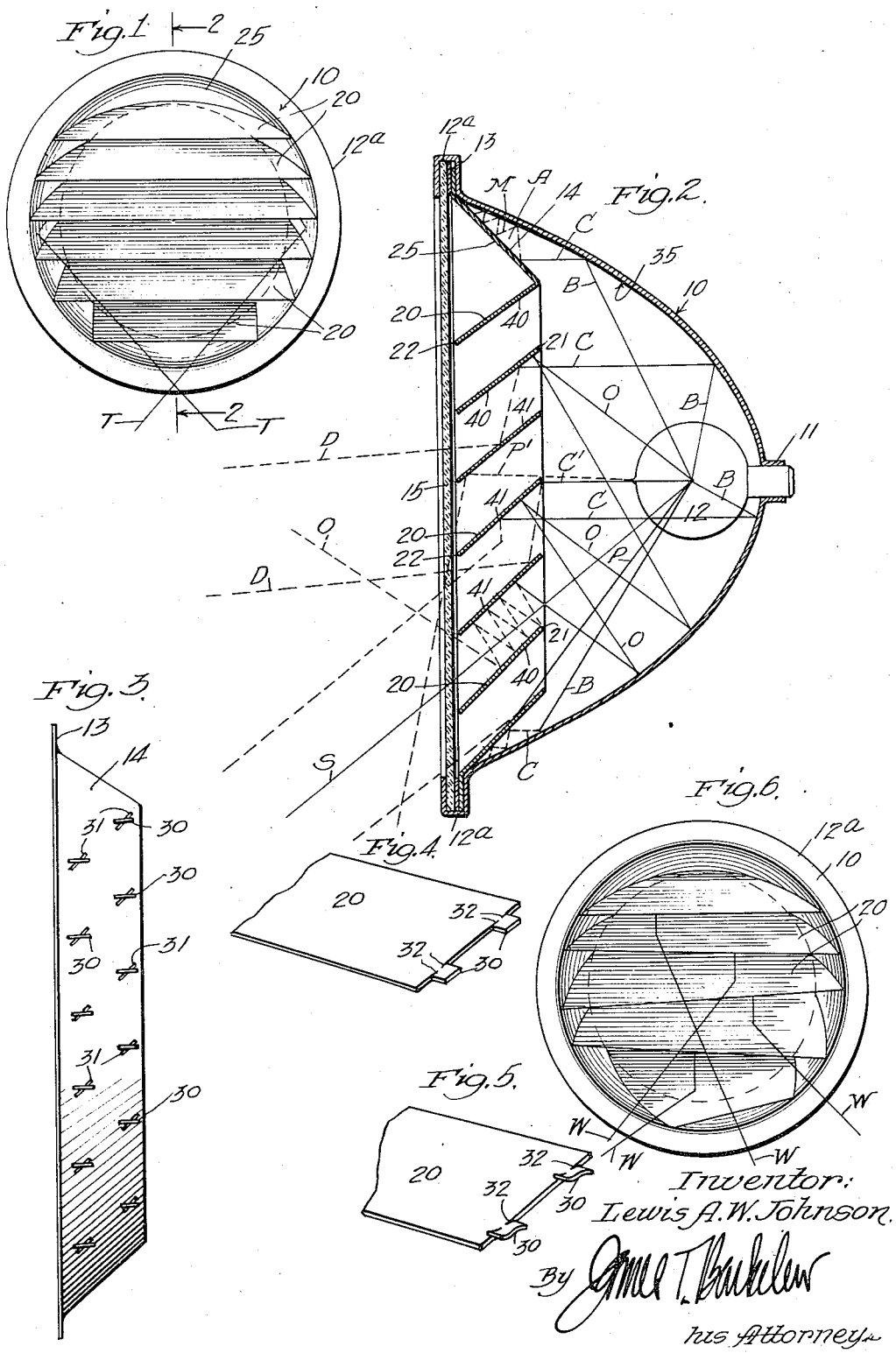
Inventor:
Lewis A. W. Johnson,
By James T. Bakelew
his Attorney Patented June 5, 1923.

1,457,630

UNITED STATES PATENT OFFICE.

LEWIS A. W. JOHNSON, OF LOS ANGELES, CALIFORNIA.

HEADLIGHT.

Application filed August 12, 1920. Serial No. 403,060.

*To all whom it may concern:*

Be it known that I, LEWIS A. W. JOHNSON, a citizen of the United States, residing in Los Angeles, county of Los Angeles, State of California, have invented new and useful Improvements in Headlights, of which the following is a specification.

This invention has to do with headlights and more specifically headlights of that general character commonly used on motor vehicles and the like. An object of the invention is to provide an effective efficient headlight from which there is no glare and which causes general illumination in its immediate vicinity as well as an effective spread illumination for a considerable distance.

This particular application has to do more or less with improvements on headlights of the character set forth in my copending application entitled Headlight, filed December 1, 1919, Serial No. 341,728. In relating to headlights of this character the invention is not limited to any specific use or application, although it is best adapted for use in connection with vehicles, and the like. For purpose of illustration and to facilitate in setting forth the nature of the invention I herein refer to it specifically as applied to a motor vehicle headlight.

A particular feature of the invention is the provision of a headlight wherein all of the light from the illuminant is utilized to advantage and for effective illumination; and from which positively no direct beams or shafts of light are directed outwardly in a manner to blind, or to interfere with the vision of approaching motorists. The light from the illuminant is reflected horizontally outward by a suitable curved main reflector, and then all of these reflected beams of light are deflected or reflected downwardly upon the roadway, ahead of the vehicle, by and upon passing between a series of suitably arranged substantially flat double reflecting faced auxiliary reflectors. However, a certain amount of diffused light will pass outwardly between the auxiliary reflectors, around the lamp, but such light will not be composed of direct rays or reflected direct rays, such as to defeat the primary object of the invention. Certain direct rays of light from the illuminant pass between the auxiliary reflectors without being reflected, but these may only pass in a downward direction to illuminate the roadway immediately ahead of the vehicle.

A further feature is the relative alternate longitudinal tilting of the auxiliary reflectors, so that rays of light from the main reflector will be deflected to either side of the lamp, to illuminate the roadway at either side of the vehicle in the immediate vicinity of its forward end.

Other objects and features of the invention as well as those hereinabove mentioned will be best and more fully understood from the following detailed description of preferred embodiments of the invention throughout which reference is had to the accompanying drawings in which—

Fig. 1 is a front view of the headlight made in accordance with the present invention; Fig. 2 is a vertical detailed sectional view of the headlight taken as indicated by line 2—2 on Fig. 1, being a view showing diagrammatically the paths of typical rays of light from the illuminant; Fig. 3 is a side elevation of the reflector carrier showing it removed from the rest of the headlight and showing the manner in which the reflectors are secured in it; Fig. 4 is a perspective view of one end portion of a reflector as it appears before being arranged in the carrier; Fig. 5 is a perspective view of one end portion of a reflector showing the way it is bent when secured in the carrier, it being shown, however, independently of the carrier and Fig. 6 is a view similar to Fig. 1 of another form of the invention.

Throughout the drawings numeral 10 designates the main reflector of the headlight which is formed at its center with a socket 11 to carry an electric bulb 12, and which is formed at its periphery with an annular inwardly faced groove portion 12$^a$ adapted to carry a flange 13, formed on carrier 14, and a transparent cover plate 15. The particular reflector 10 shown in the drawings is intended to typify the main reflector of the ordinary motor vehicle headlight while the transparent cover plate 15, which is preferably glass, and the groove portion 12$^a$, of reflector 10 which carries the transparent cover plate 15, are also disclosed as typical parts and constructions found in motor vehicle headlights. Further it may be stated that the electric bulb and its manner of mounting are such as are commonly employed in devices of this character and are set forth merely to illustrate the general type or character of apparatus that may be employed in carrying out the present invention.

The carrier 14, at the forward edge or end of which is formed the flange 13, is an annular sheet metal ring-like member of a frusto conical configuration tapering inwardly from its forward end to its rear end. The flange 13 is preferably formed integrally on the carrier 14 and the inward convergence of the carrier 14 is preferably of such amount as to cause a space A to be left between it and inner surface 35 of the reflector 10. The space A, of course, is an annular space and is substantially V-shaped in a cross sectional configuration, as clearly shown in Fig. 2 of the drawings.

A plurality of substantially flat double faced reflectors 20 are arranged horizontally across the main reflector 10, forward of the light bulb 12 and carried one above the other in the carrier 14. The reflectors 20 are of such width as to extend completely through, or from the front end to the rear end of, the carrier 14 and tilted or angularly set in the carrier 14 so that their rear edges 21 are considerably above their front edges 22. Further, there is such a number of reflectors 20 and the angularity of adjacent reflectors is such that the top and bottom edges of adjacent reflectors relative to the axis of the main reflector overlap. The angularity of the reflectors varies between adjacent reflectors and increases in amount from the top to the bottom of the device, varying in practice approximately two degrees between adjacent reflectors. In the preferred form of construction the upper edge of the uppermost reflector joins or connects with the inner face 25 of the carrier 14 throughout its entire length, as clearly shown in Figs. 1 and 2.

As a simple, effective and inexpensive means for mounting the reflectors 20 in the carrier 14 two tabs 30 are formed at each end of each of the reflectors to extend into and through suitably arranged openings or slots 31 formed in the carrier 14. The tabs 30 are preferably formed integrally with the reflectors 20 and are formed at their sides with cuts 32. To arrange the tabs in and through the slots 31 the reflectors are slightly sprung or bent until their length is decreased a sufficient amount to permit of the tabs being freely and conveniently placed in the slots. The tabs 30 when arranged in the slots 31 are bent or twisted, as shown in Figs. 3 and 5 to prevent them from being withdrawn from the slots 31 and to thereby positively and securely hold the reflectors in place in the carrier. It will be understood that the cuts 32 permit of the tabs being bent as shown in Figs. 3 and 5 and that the tabs can be bent back to their original shape if it is necessary or desired to remove the reflectors from the carrier.

The interior surface 35 of the reflector 10 is, of course, a highly polished or reflective surface as are all the surfaces of the structure formed by the carrier 14 and reflectors 20. In practice the illuminant 12 is focused so the rays of light are reflected outwardly by the surface 35 substantially parallel to the axis of the reflector 10. In Fig. 2 lines B indicate the rays of light from the illuminant striking the surface 35 which are thence reflected as axially parallel rays C. Substantially all of the rays C strike the lower reflecting surfaces 40 and are thence reflected downwardly onto the upper reflecting surfaces 41, of the reflectors 20. The surfaces 41 then direct the rays C outwardly and downwardly, relative to the axis of the reflector 10, as indicated by the lines D in Fig. 2. The difference in angularity between adjacent reflectors 20 causes the rays D to be reflected at an angle, relative to the rays C; and due to their uniform increase in angularity, from top to bottom, towards the vertical, the rays D will all be substantially parallel, thereby effecting a uniform distribution of light to a maximum distance ahead of the vehicle, but with all rays directed downwardly relative to the axis of the main reflector.

As will be seen from inspection of Fig. 2 of the drawings some of the parallel horizontal rays C from reflector 35 are not reflected directly out of the device through or between adjacent surfaces of reflectors 20, but are reflected in to the space A between the outer face of carrier 14 on the surface 35. The line M in Fig. 2 indicates generally the path of one such ray and shows clearly the way in which the ray is reflected between the carrier 14 and surface 35 into the very bottom of the space A. Even if the surface of the parabolic reflector and the back surface of the carrier 14 are as perfect reflectors as can be made there will be a certain amount of dispersion of the light on each reflection. After a large number of reflections the total amount of light dispersively reflected will become fairly large and the pocket around the rear end of the carrier become generally illuminated. This general illumination will cause some of the light to be thrown back onto the central parts of the parabolic reflector and be reflected out as general illumination, that is as stray rays, causing a general illumination in front of the headlight.

Rays of light C' shining horizontally from the illuminant directly onto the reflectors 20 are reflected through and between the reflectors 20 in the same manner as are the rays C from reflector 10. Other rays of light shining directly from the illuminant onto the reflectors 20 are in part reflected directly out of the device by the reflecting surfaces which they first engage, and are in part directed either onto another reflector 20 or onto the surface 35 and continue to reflect between the various surfaces of the device until they finally issue from the lamp in great diffusion. One such ray is indicated by the line O in Fig. 2.

Rays of light such as are indicated by line P in Fig. 2 shine from the illuminant directly onto one of the reflectors 20 and are thrown therefrom directly to the ground. Only rays shining outwardly and downwardly from the illuminant or only slightly upwardly from the illuminant can be reflected in this manner as the overlapping arrangement of reflectors 20 causes rays shining at any considerable angle upwardly of the horizontal to be reflected between reflectors 20, or thrown back into the device onto surface 35 before they can issue from the device. Line P' in Fig. 2 shows the path of a ray of light shining only slightly upwardly from the illuminant and shows clearly how it is directed almost straight downwardly from the device. Those rays which issue from the device upon being reflected only once, and those rays, such as are indicated by line S which pass directly between the reflectors 20 all shine downwardly at considerable of an angle and thereby cause very effective illumination of the road close to and directly ahead of the vehicle on which the lamp is mounted.

Illumination to the sides of the device is affected or caused largely by rays of light shining from the reflectors 20 and from the surface 35 onto the curved inner surface of the carrier 14. In Fig. 1 the lines T show the paths of two typical rays of this character and show clearly the manner in which such rays are thrown to the sides of the device. It will be understood of course that rays of light T reflected from the inner surface of carrier 14 need not be horizontal parallel rays but can be, in part, rays diffusedly reflected in the device in any of the manners hereinbefore described.

In practice by constructing the device so that the upper edge of the uppermost reflector 20 engages the inner surface of carrier 14 prevents an excessive amount of diffused light from being thrown upwardly and outwardly from the lamp. This prevents a glaring light from being thrown into the eyes of the occupants of oncoming vehicles and therefore is of particular importance.

In practice when the various reflectors or reflecting surfaces of the device are made with ordinary care and accuracy there is sufficient irregularity and unevenness in them to cause considerable diffusion of parallel rays of light that may fall upon them. For instance, by the time rays of light have passed from the illuminant to the surface 35, and from the surface 35 to and between the reflectors 20, practically none of them are parallel.

In Fig. 6 of the drawings is shown an arrangement of reflectors 20 by which very effective spreading of the light from side to side is had. In the form of the invention shown in this figure the reflectors 20 are arranged and relatively positioned in the carrier 14 in the same manner as they are in the form first described, except they are not horizontally parallel. From inspection of Fig. 6 it will be seen that adjacent reflectors 20 tilt in opposite directions relative to the horizontal, thereby causing alternate reflectors to be tilted in the same direction. Further, it will be noted that the angularity of the reflectors 20 increases from top to bottom, or that is, the reflectors at the top of the device are not tilted or set at as great an angle, relative to the horizontal, as are the ones at the bottom of the device. The lines W in Fig. 6 show the paths of some rays of light shining from the lamp. The particular rays shown in this figure are rays such as the rays D in the form of the invention first described. It will be readily understood of course that the difference in angularity between adjacent reflectors will determine largely the amount that the light will be spread. In practice by combining the angularity of the reflectors from front to rear, with that of the reflector from side to side, just described, a device is produced which will very effectively throw or spread light downwardly and over the road in front of the vehicle on which the device is mounted.

Having described a preferred form of my invention, I claim:

1. The combination with a source of illumination, and a main reflector, of a series of vertically spaced auxiliary reflectors extending transversely of the main reflector, all of said auxiliary reflectors being inclined both vertically and horizontally, the vertical angularity increasing progressively from the top to the bottom of the series, so that the lowest reflector is more nearly vertical than any of the others.

2. The combination with a source of illumination, and a main reflector, of a series of vertically spaced auxiliary reflectors extending transversely of the main reflector, each of said auxiliary reflectors being inclined both vertically and horizontally the horizontal inclination being continuous in the same direction throughout the length of the reflector and adjacent members of the series being inclined horizontally in opposite directions.

In witness that I claim the foregoing I have hereunto subscribed my name this 2nd day of August, 1920.

LEWIS A. W. JOHNSON.